US012595963B2

(12) United States Patent
Rhoades et al.

(10) Patent No.: US 12,595,963 B2
(45) Date of Patent: Apr. 7, 2026

(54) HEAT RECOVERY STEAM GENERATOR ACCESS DOOR ASSEMBLY AND METHOD OF INSTALLATION

(71) Applicant: Power & Industrial Services Corporation, Donora, PA (US)

(72) Inventors: Michael Lance Rhoades, South Park, PA (US); Albert Charles Suter, IV, McMurray, PA (US)

(73) Assignee: Power & Industrial Services Corporation, Denora, PA (US)

(*) Notice: Subject to any disclaimer, the term of this patent is extended or adjusted under 35 U.S.C. 154(b) by 823 days.

(21) Appl. No.: 17/941,399

(22) Filed: Sep. 9, 2022

(65) Prior Publication Data

US 2024/0085113 A1 Mar. 14, 2024

(51) Int. Cl.
*F27D 1/18* (2006.01)
*F27D 1/00* (2006.01)

(52) U.S. Cl.
CPC .... *F27D 1/1866* (2013.01); *F27D 2001/0046* (2013.01)

(58) Field of Classification Search
None
See application file for complete search history.

(56) References Cited

U.S. PATENT DOCUMENTS

| | | | |
|---|---|---|---|
| 4,977,838 | A | 12/1990 | Farrell et al. |
| 5,803,021 | A | 9/1998 | Rourke et al. |
| 7,389,610 | B1 | 6/2008 | McMakin et al. |
| 7,404,363 | B2 | 7/2008 | Dunstan |
| 9,021,744 | B2 | 5/2015 | Kirkpatrick et al. |
| 9,500,359 | B1 | 11/2016 | Kirkpatrick et al. |
| 2009/0183693 | A1 | 7/2009 | Furman |

*Primary Examiner* — Jason Lau
(74) *Attorney, Agent, or Firm* — Carothers and Carothers

(57) ABSTRACT

An efficient method of installing an access door in a high temperature structure having an outer door casing spaced from an inner door liner, wherein the casing and liner are aligned to thereby define a passageway through a wall of the structure. The space between the casing, the liner and the structure wall is filled with compressed insulation, and this filled space is temporarily closed off with liner insert plates which thereby compress the insulation and provide a temporary door casing frame. The replacement prehung door assembly is installed in this surrounding temporary door casing frame, and the doorframe assembly is secured to the inner door liner, and thereafter the temporary insert plates closing off the space between the door casing and door liner are removed thereby permitting the compressed insulation in the space between the casing and the liner to expand and engage the doorframe assembly.

3 Claims, 4 Drawing Sheets

Fig. 4
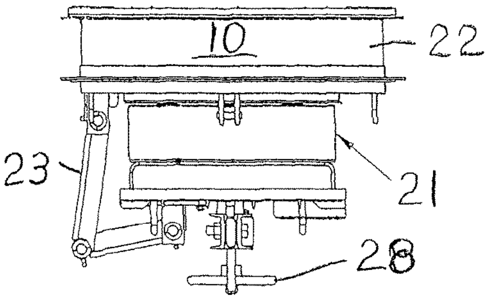
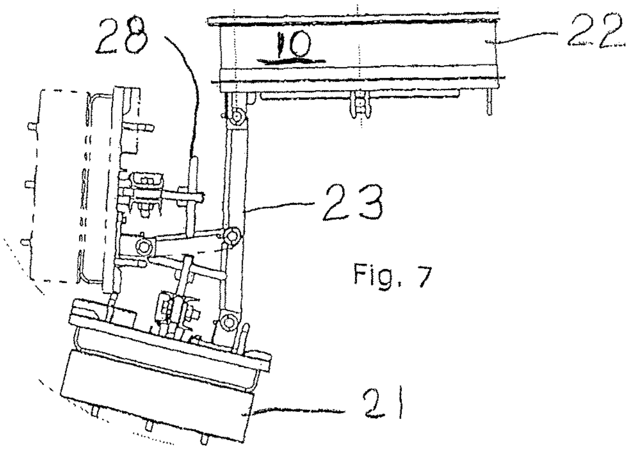
Fig. 7
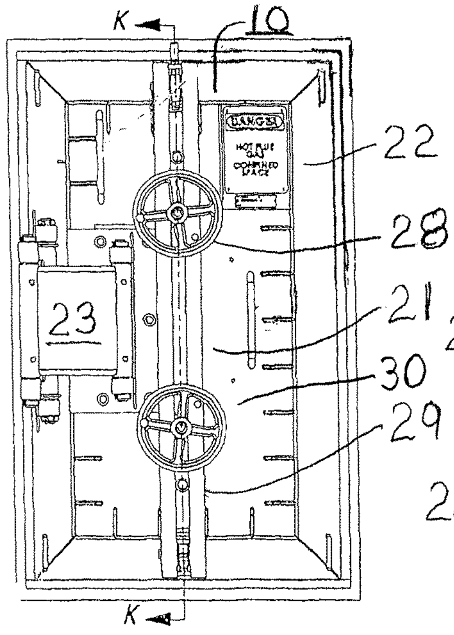
Fig. 5
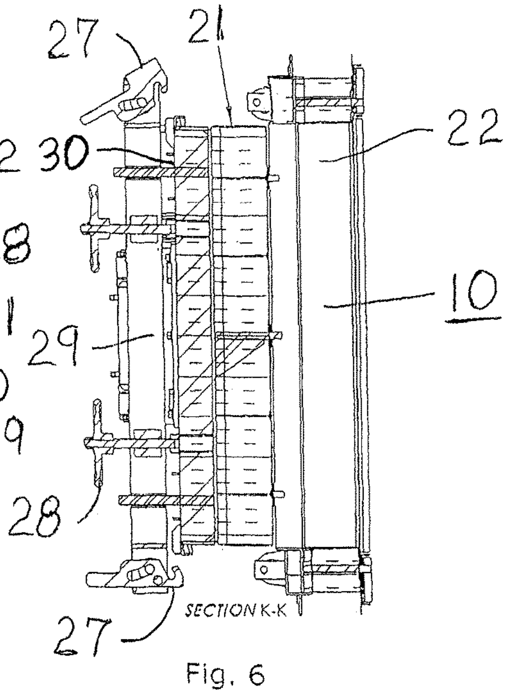
Fig. 6

HEAT RECOVERY STEAM GENERATOR ACCESS DOOR ASSEMBLY AND METHOD OF INSTALLATION

BACKGROUND OF THE INVENTION

This invention relates generally to a door system, and in particular to a door system suitable for use for high temperature applications, such as boilers, flues, bag houses, precipitators, scrubbers, heat recovery steam generator access doors, and the like. In particular, this invention pertains to a modular system for rapidly replacing such access doors.

Industrial furnaces, such as Heat Recovery Steam Generator (HRSG) doors designed to prevent heat and gas emissions, are fabricated with a surrounding support structure lined with refractory material which may be precast or laid up of refractory tile or brick. One or more access openings are required to allow for interior maintenance, charging of the furnace or other procedures wherein access must be created to the interior of the furnace. Such access doors must be periodically replaced and it is desirable to provide a replacement door assembly which can be rapidly installed in order to minimize downtime during a furnace turnaround.

This invention is directed to providing a modular door assembly and a method of installation for such an access door in industrial furnaces for ready replacement thereof, and to greatly reduce down time during furnace turnaround.

SUMMARY OF THE INVENTION

A method is provided for installing an access door in a high temperature structure having an outer door casing spaced from an inner door liner wherein the casing and liner are aligned to thereby define a passageway through a wall of the structure. The space between the casing and the liner and the wall opening is filled with insulation and this space is between the casing and the liner is temporarily closed off with insert plates which thereby compresses the insulation in the space and provides a temporary door casing frame.

A pre-hung door assembly having an insulated door in sealed removable engagement with a surrounding insulated doorframe assembly is installed into this temporary door casing frame. The doorframe assembly is dimensioned and contoured to be surrounded by and engage the temporary door casing frame.

Then the installed door assembly is secured in the temporary door casing frame, and thereafter the insert plates which temporarily close off the space between the casing and the liner are removed thereby permitting the compressed insulation in this space between the casing and the liner to expand and engage the doorframe assembly.

The pre-hung door assembly is secured in the temporary door casing frame by securing liner retainer plates to the inside outer perimeter edge of the doorframe assembly. These liner retainer plates extend from the doorframe assembly over the inside perimeter edge of the door liner inside the high temperature structure.

When the temporary insert plates are removed from this assembly, a gap remains between the doorframe assembly and the door casing. More insulation can be stuffed through this gap if required. This gap is sealed shut after the plates are removed.

Minimal field welding is required and the method of the present invention significantly reduces field labor complexity, time and costs as compared to other HRSG access door designs available on the market.

BRIEF DESCRIPTION OF THE DRAWINGS

Other objects and advantages appear hereinafter in the following description and claims. The accompanying drawings show, for the purpose of exemplification, without limiting the scope of the invention or appended claims, certain practical embodiments of the present invention wherein:

FIG. 4 is a top view of the access door assembly shown in FIG. 1 installed in a high temperature furnace structure and illustrating the door hung on a triple action hinge with the door pulled straight out from the doorframe assembly;

FIG. 5 is a view in front elevation of the access door assembly shown in FIG. 4;

FIG. 6 is a vertical sectional view of the access door assembly shown in FIG. 5 as seen along section line K-K;

FIG. 7 is a top view of the access door assembly shown in FIG. 4 illustrating the possible open positions of the door relative to the doorframe assembly;

DETAILED DESCRIPTION OF THE PREFERRED EMBODIMENTS

Figure 8:
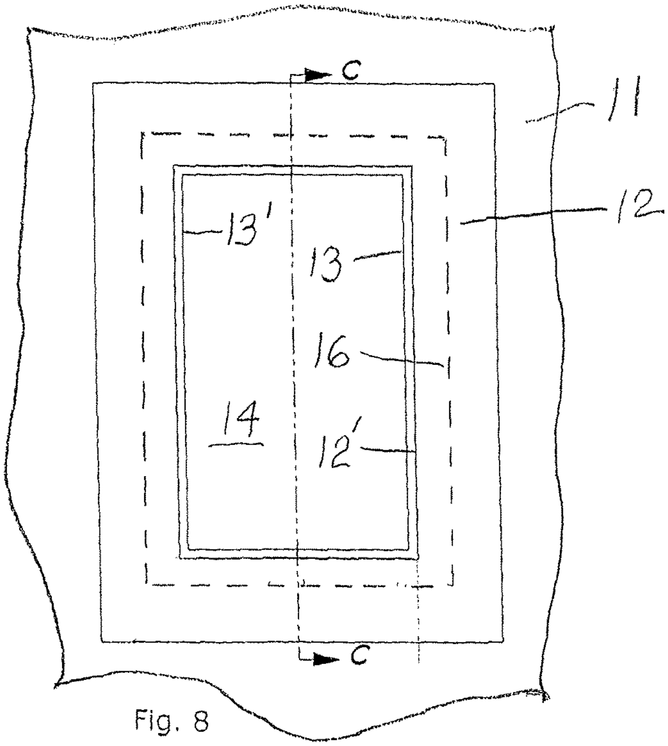
FIG. 8 is a view in front elevation of the temporary insert plates closing off the space between the outer door casing and the inner door liner, providing a temporary door casing frame for the access door assembly illustrated in FIG. 1.
Figure 9:
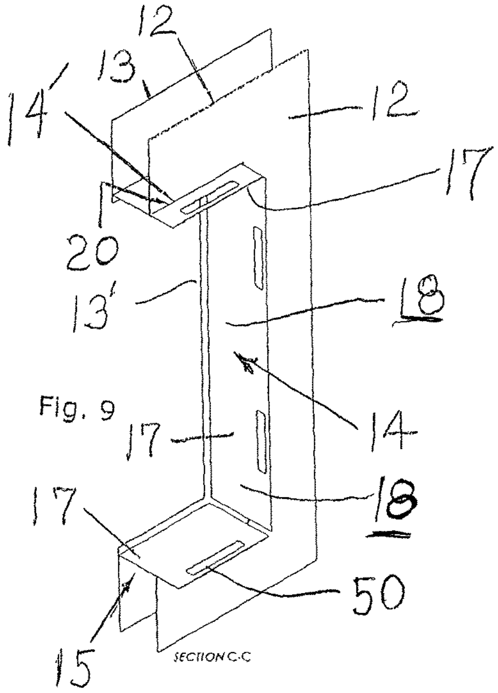
FIG. 9 is a sectional perspective view in front elevation of the temporary door casing frame structure shown in FIG. 8 as seen along section line C-C.
Figure 10:
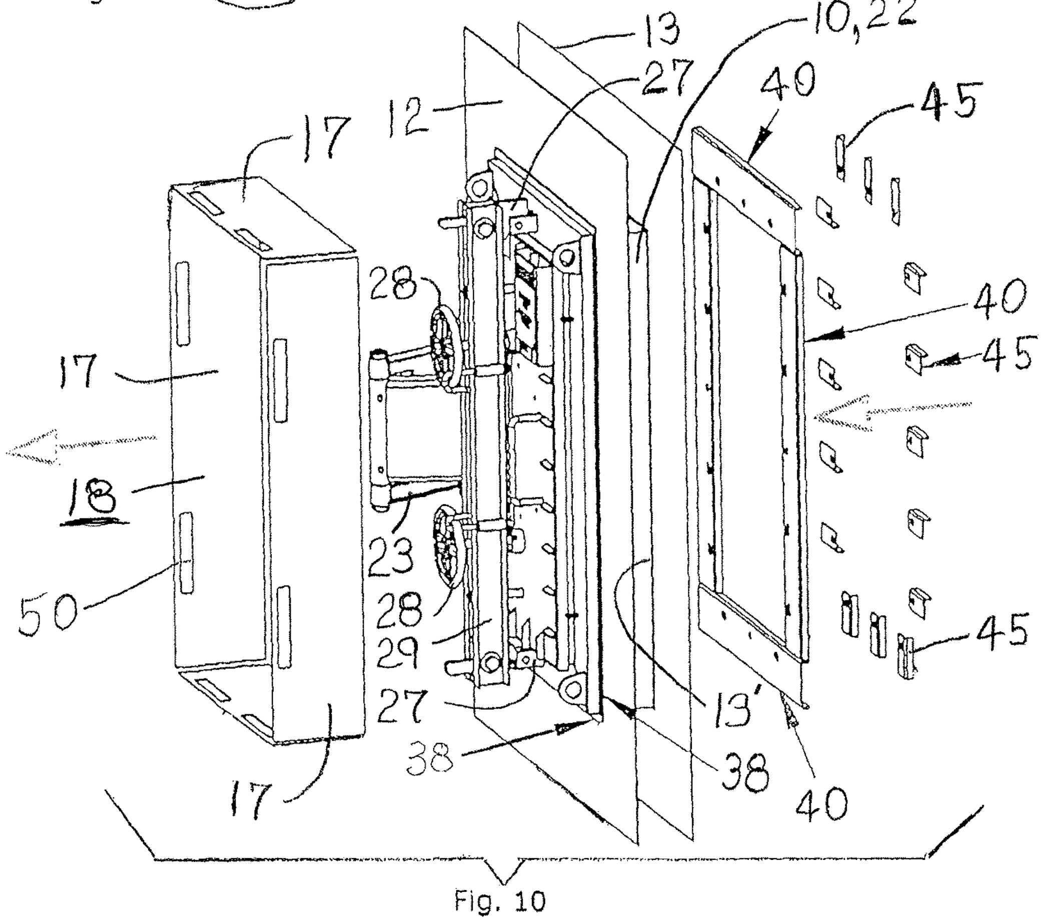
FIG. 10 is an exploded perspective view of the access door assembly of the present invention illustrating the method of installation of the present invention.
Figure 11:
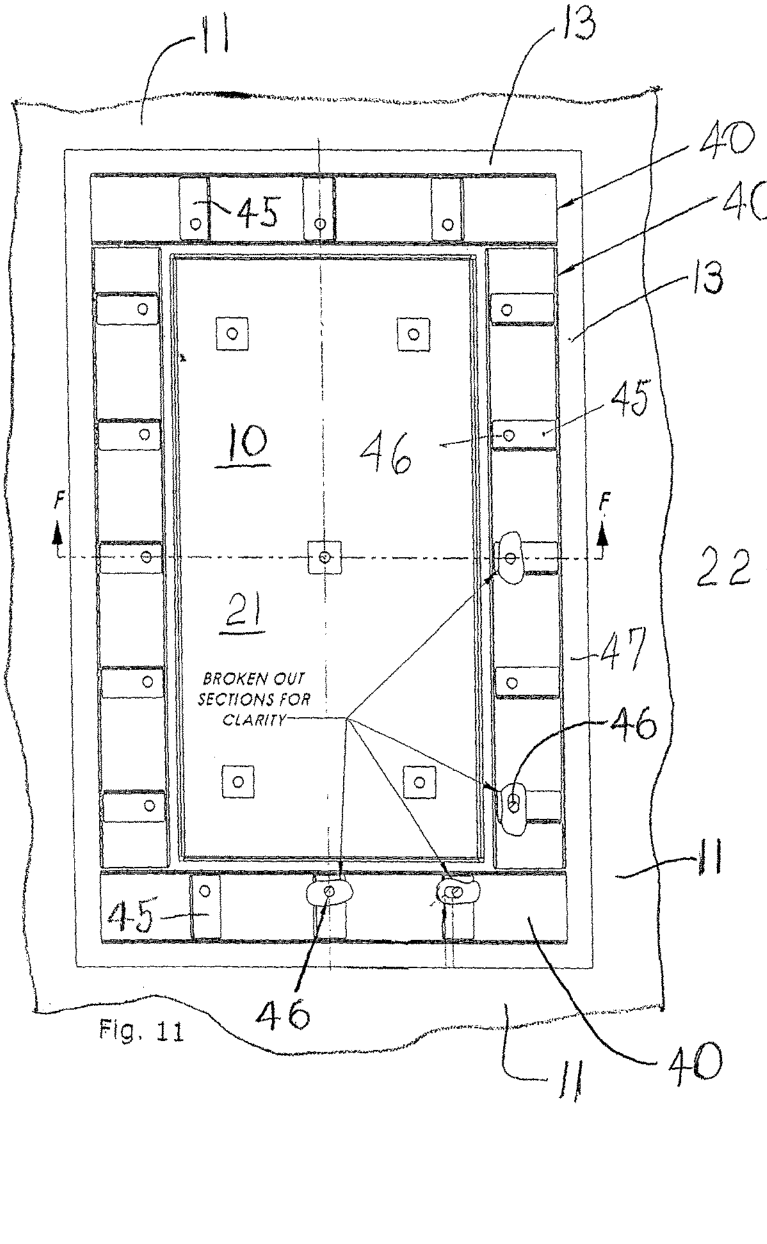
FIG. 11 is a rear view in elevation of the completed door assembly as illustrated in FIG. 4 through 7.
Figure 12:
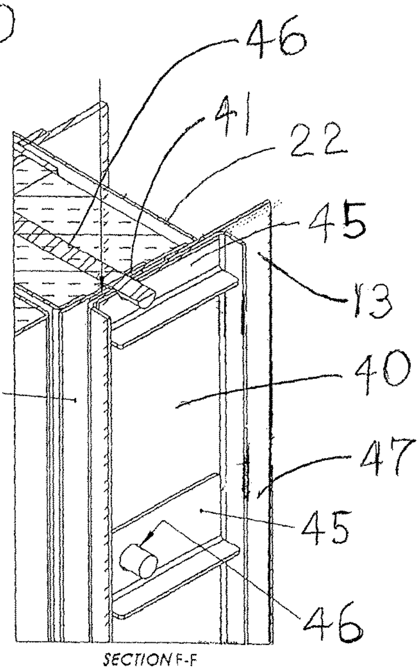
FIG. 12 is a perspective view in partial cross section of the access door assembly shown in FIG. 11 as seen along section line F-F.

Referring to the drawings, the present invention provides a novel method for installing an access door assembly 10, in a high temperature structure 11 (see FIGS. 8 and 11), such as a heat recovery steam generation, that is provided with an outer door casing 12 spaced from an inner door liner 13, wherein the casing 12 and liner 13 are aligned to thereby define a passageway 14 through the wall of the structure 11 (see FIGS. 8, 9 and 11). When the access door being replaced is removed, the outer door casing 12 and the inner liner 13 generally do not require replacement and remain for installation of the replacement access door assembly 10.

When installing the prehung access door assembly 10 of the present invention, the space 15 between the outer casing 12 and the inner liner 13 is filled with insulation, such as high efficiency alumina-silica ceramic insulation, between in an inner edge 16 of the wall of higher temperature structure 11 and the internal circumferential edges 12' and 13' of casing 12 and liner 13 respectively (see FIGS. 8 and 9). The door installation process is then continued by temporally closing off this insulation filled space 15 between casing 12 and liner 13 with insert plates 17 thereby compressing the insulation in space 15 and providing a temporary door casing frame 18. Temporary insert plates 17 are temporarily retained in position by tack welds between temporary insert plates 17 and outer door casing 12 at periodically spaced positions as indicated at 20. In applying temporary insert plates 17, the plates 17 thereby compress the insulation contained within the space 15 between casing 12 and liner 13.

Figure 1:
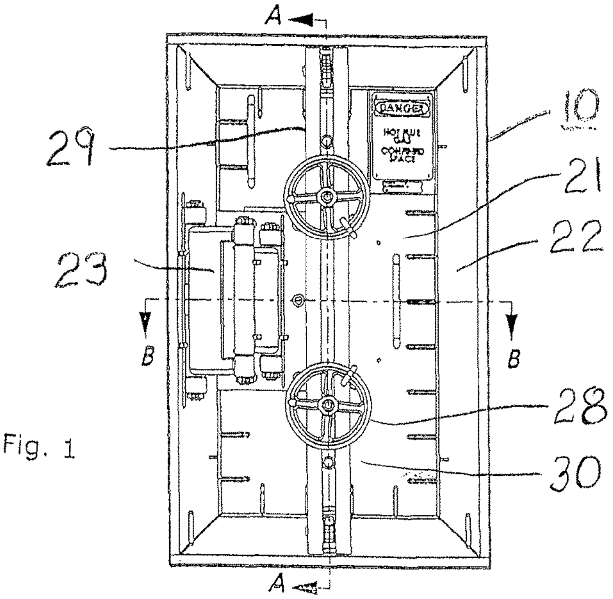
FIG. 1 is a view in front elevation of the access door assembly of the present invention.
Figure 2:
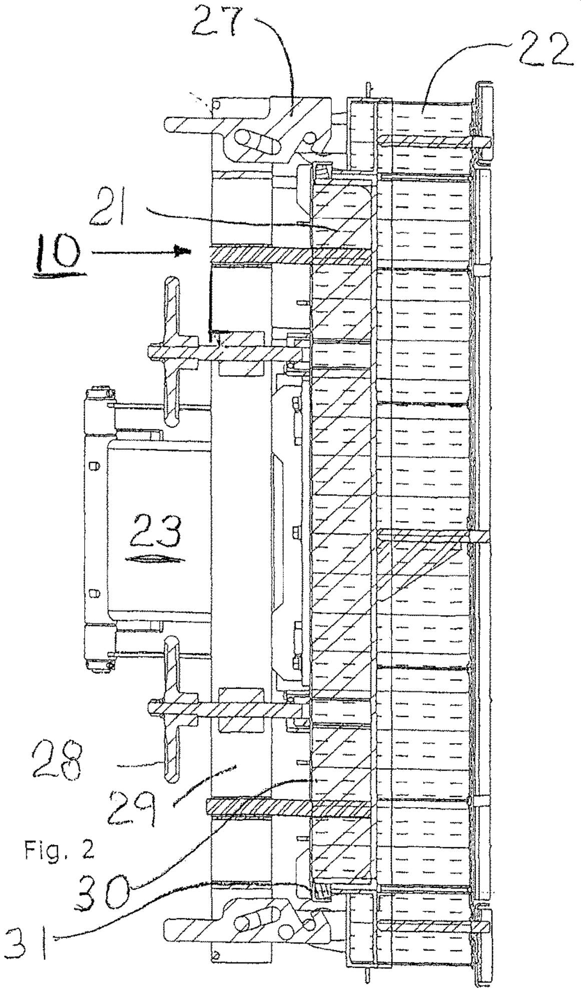
FIG. 2 is an enlarged view in cross section of the access door assembly shown in FIG. 1 as seen along section line A-A.
Figure 3:
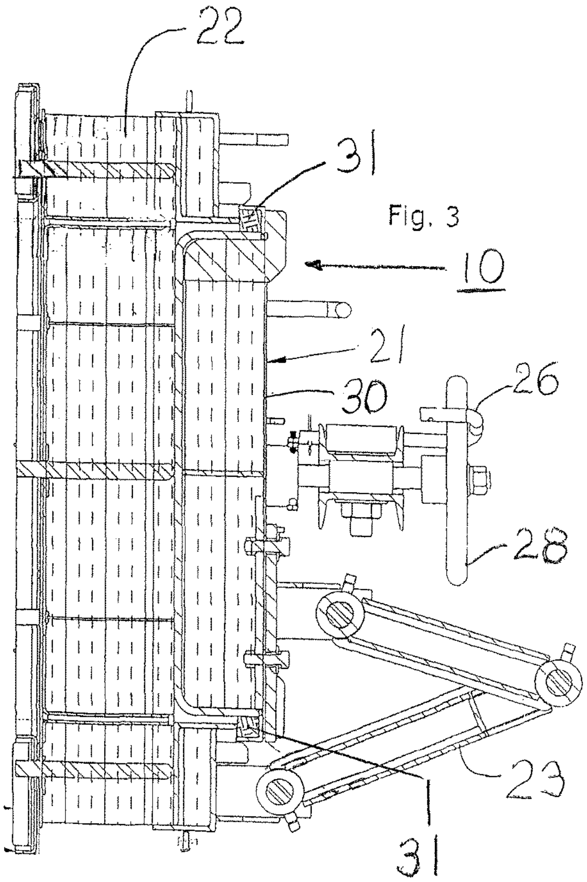
FIG. 3 is an enlarged view in cross section of the access door assembly shown in FIG. 1 as seen along section line B-B.

Prehung access door assembly 10 is a prehung door assembly having an insulated door 21 in sealed removable engagement with a surrounding insulated doorframe assembly 22. Insulated door 21 is hinged with respect to insulation doorframe assembly 22 with a triple acting hinge 23 having three hinge joints as best illustrated in FIG. 3. This hinge 23 permits door 21 to be pulled straight out away from insulated doorframe assembly 22 as illustrated in FIGS. 4 and 7. This permits insulated door 21, together with its insulated doorframe assembly 22, to be well insulated and therefore quite thick in construction, thereby permitting door assembly 21 to readily withdrawn from doorframe assembly 22, yet providing an excellent seal between door 21 and doorframe assembly 22 when the access door assembly 10 is in a closed position.

Access door 21 when closed in doorframe assembly 22, is secured to doorframe assembly 22 with latches 27. Two hand actuated hand wheel clamps 28 are threadably supported from vertical beam 29, which in turn is secured to latches 27. Hand wheel clamps 28 are operable to apply pressure against an exterior portion 30 of door 21 relative to latches 27 in order to thereby clamp door 21 against a door seal 31 between door 21 and doorframe 22. Hand wheel clamps 28 may be locked in position with a lock pin 26.

The installation processes continues by installing the closed prehung access door assembly 10, which includes insulated door 21 in closed sealed engagement with surrounding insulated doorframe assembly 22, in to the temporary door casing frame 18 provided by temporary insert plates 14. The doorframe assembly 22 is dimensioned and contoured to be surrounded by and engaged with temporary door casing frame 18 in passageway 14. Once the access door assembly 10 has been fully inserted within the temporary door casing frame 18, the doorframe assembly 22 is firmly secured within the temporary door casing frame 18. This is accomplished by securing liner retainer plates 40 to the inside outer perimeter edge 41 of doorframe assembly 22. This is accomplished by welding liner retainer tabs 45 to studs 46, which are permanently engaged with doorframe assembly 22. These liner retainer plates 40 extend from the doorframe assembly 22 over the inside perimeter edge 47 of inner liner 13 for sealed securement of prehung doorframe assembly 10 to inner liner 13.

The next step of the insulation process is then removing temporary insert plate 17 which close off the space 15 between casing 12 and liner 13, thereby permitting the insulation contained in space 15 between casing 12 and liner 13 to expand and engage the doorframe assembly 22.

Temporary insert plates 17 are removed by removing the temporary tack welds at positions 20 and sliding out the temporary retainer plates 17 with appropriate equipment which engages the temporary retaining plates 17 by the handle slots 50.

When temporary retainer plates 17 are removed, a gap remains between the doorframe assembly 22 and the door casing 12, and this gap is sealed closed with a metal seal ring 38 welded to the outer casing 12. Additional insulation may be stuffed through the gap before it is sealed closed.

The unique door design of the present invention as described requires a rectangular opening cut in the door casing 12 and a slightly smaller rectangular opening cut through the inside liner 13, a set of temporary insert plates 17 to be used during the field installation process to assist with compressing and retaining the wall insulation in space 15 back away from the new door opening. Thus in all, minimal field welding is required for installing the access door assembly 10 of the present invention which significantly reduces labor complexity, time and cost as compared to existing HRSG access door designs.

We claim:

1. A method of installing an access door in a high temperature structure having an outer door casing spaced from an inner door liner, said casing and liner aligned to thereby define a passageway through a wall of said structure, comprising:

filling the space between said casing and said liner with insulation;

temporarily closing off said insulation filled space between said casing and said liner with insert plates and thereby compressing said insulation and providing a temporary door casing frame;

installing a prehung door assembly having an insulated door in sealed removable engagement with a surrounding insulated doorframe assembly into said temporary door casing frame, said doorframe assembly dimensioned and contoured to be surrounded by and engaged with said temporary door casing frame;

securing said doorframe assembly in said temporary door casing frame; and removing said insert plates temporarily closing off said space between said casing and said liner and thereby permitting said insulation in said space between said casing and said liner to expand and engage said doorframe assembly.

2. The method of claim 1, wherein said prehung door assembly is secured in said door casing frame by securing liner retainer plates to the inside outer perimeter edge of said doorframe assembly, said liner retainer plates extending from said doorframe assembly over the inside perimeter edge of said door liner.

3. The method of claim 1, wherein when said plates are removed a gap remains between said doorframe assembly and said door casing, and said method including sealing said gap closed.

* * * * *